United States Patent [19]

Linton et al.

[11] Patent Number: 4,623,585
[45] Date of Patent: Nov. 18, 1986

[54] CELLULAR CERAMIC INSULATING BODY AND METHOD FOR MAKING SAME

[75] Inventors: Robert W. Linton, Export; Alex W. Orlowski, Trafford, both of Pa.

[73] Assignee: Pittsburgh Corning Corporation, Pittsburgh, Pa.

[21] Appl. No.: 771,306

[22] Filed: Aug. 30, 1985

Related U.S. Application Data

[63] Continuation of Ser. No. 558,808, Dec. 7, 1983.

[51] Int. Cl.$^4$ .................... B32B 1/08; B32B 3/26; B32B 7/12; B32B 31/00
[52] U.S. Cl. .................... 428/312.8; 156/256; 156/263; 156/264; 156/266; 428/36; 428/316.6; 428/317.1; 428/317.7
[58] Field of Search ............ 428/36, 49, 71, 76, 428/312.6, 312.8, 314.4, 314.8, 316.6, 317.1, 317.7, 319.1; 156/250, 256, 263, 264, 266

[56] References Cited

U.S. PATENT DOCUMENTS

| 2,641,561 | 6/1953 | Black | 428/312.6 |
| 3,157,204 | 11/1964 | Phillips | 138/137 |
| 3,325,341 | 6/1967 | Shannon | 428/406 |
| 3,354,024 | 11/1967 | D'Eustachio et al. | 428/406 |
| 3,418,399 | 12/1968 | Ziegler | 156/86 |
| 3,441,396 | 4/1969 | D'Eustachio et al. | 65/22 |
| 3,528,400 | 9/1970 | Norwalk et al. | 126/144 |
| 3,614,967 | 10/1971 | Royston | 428/312.6 |
| 3,760,971 | 9/1973 | Sterrett | 428/316.6 |
| 3,959,541 | 5/1976 | King et al. | 428/312.6 |

FOREIGN PATENT DOCUMENTS

1558176 12/1979 United Kingdom ............ 428/318.4

OTHER PUBLICATIONS

PC 88 Adhesive Product Data Sheet, Pittsburgh Corning (10/13/77) FI-125 5M Rev. 10/82, 2 pages.
Foam Glass Insulation Systems, Pittsburgh Corning FI-160 30M Rev. 5/83, 27 pages.

Primary Examiner—William J. Van Balen
Attorney, Agent, or Firm—Stanley J. Price, Jr.

[57] ABSTRACT

A cellular ceramic insulating body that includes a plurality of rigid cellular ceramic segments adhesively secured to one another by a bonding agent. The cellular ceramic segments are arranged to be positioned adjacent to the surface of a member to be insulated. The bonding agent forms a flexible bond that substantially prevents thermal stress failure in the cellular ceramic insulating body at temperatures up to at least 650° F. The cellular ceramic insulating body is operable to resist thermally induced cracking in the cellular ceramic segments at temperatures up to at least 650° F.

10 Claims, 4 Drawing Figures

CELLULAR CERAMIC INSULATING BODY AND METHOD FOR MAKING SAME

CROSS REFERENCE TO RELATED APPLICATION

This application is a continuation of copending application Ser. No. 558,808, filed on Dec. 7, 1983, entitled, "Cellular Ceramic Insulating Body And Method For Making Same", by Robert A. Linton and Alex W. Orlowski.

BACKGROUND OF THE INVENTION

1. Field of the Invention

This invention relates to an insulating body and, more particularly, to a cellular ceramic insulating body comprising a plurality of rigid cellular ceramic segments adhesively secured to one another by a bonding agent. The bonding agent forms a flexible bond that substantially prevents thermal stress failure in the cellular ceramic insulating body at temperatures up to at least 650° F.

2. Description of the Prior Art

Various insulation materials, compositions, and techniques are known for preventing heat flow to or from an insulated body. U.S. Pat. No. 3,157,204 to Phillips discloses an insulating and protective covering for metallic structures and parts, such as piping, conduits, and containers. In Phillips, a core of substantially rigid, cellular material, such as a foamed vitreous material, is surrounded by a thermoset, synthetic resinous material to provide the requisite insulation.

A method of producing a cellular glass body and the structure produced thereby suitable for use as an insulation material is disclosed in U.S. Pat. No. 3,325,341 to Shannon. In Shannon's method, the outer skins of a plurality of cellular glass pellets are fused together to form a body having interconnected interstitial voids which communicate with the exterior surface of such body. The interconnected voids are impregnated in whole or in part with either an inorganic or organic binder.

U.S. Pat. No. 3,418,399 to Ziegler discloses a method of making an insulating pipe structure wherein thermoplastic structures are positioned around the pipe to be insulated and melted out to form a plenum chamber about the pipe.

A high strength, thermal shock resistant, laminar ceramic insulating body is disclosed in U.S. Pat. No. 3,528,400 to Norwalk. Such body is formed from a plurality of thin alternate layers of magnesia, spinel or mixtures thereof such that no two adjacent layers are of the same material.

A multi-layered insulating pipe coating is disclosed in U.S. Pat. No. 3,614,967 to Royston. In Royston, the pipe is surrounded by a preformed insulation, such as cellular glass. Such preformed insulation is surrounded by a mat, which includes a first layer of heat softening resin, a layer of woven glass fabric surrounding the first resin layer, a second layer of resin, a layer of conductive foil, a third layer of resin, and an outer layer of water impervious plastic film. The overlapping edges of the mat are heat sealed together.

U.S. Pat. No. 3,959,541 to King et al. discloses a composite laminate insulating body including an inner layer and an outer layer of rigid cellular ceramic insulating material having a layer of uniformly woven glass fiber disposed between the inner and outer layers of cellular insulating material and being adhesively joined thereto by use of a rigid gypsum bonding agent.

Special problems and concerns are generally present when a heat source is kept in an elevated temperature range significantly above ambient temperature, such as is common in steam pipes and other high temperature applications. When various composite insulating materials and compositions are subjected to such elevated temperatures, small cracks or fissures usually will form throughout the cellular insulating layer from the thermal stress in such insulating layer.

Siliceous cellular insulations are known to be useful for insulation of equipment and piping over a wide temperature range of about −450° F. to 800° F. because of their impermeability, high strength, incombustibility, and low absorption of liquids. Such siliceous cellular insulations though, because of their high modulus, or rigidity, their significant thermal expansion coefficient, and low heat transmission may be subject to cracking from high thermal stresses produced by rapid changes in temperature.

The tendency of such siliceous cellular insulations to crack, often referred to as thermal shock, is dependent upon many intrinsic and operational factors, such as the rate of temperature change, the configuration of the member to be insulated, and the thickness of the insulation.

A cellular silica can be manufactured to have an expansion coefficient so low that it can substantially resist thermal shock after being placed red-hot into water. However, the melting point and cellulation temperatures of such a cellular silica are generally in excess of 3000° F. Such high temperatures are difficult to maintain economically for large scale production and other problems may be present, such as sublimation of silicon monoxide during manufacturing.

One insulating technique used in high temperature piping applications was coating a single layer cylinder of insulating material, such a cellular glass, on the outside with a reinforced gypsum or mastic coating. While such reinforced cylinder construction did not prevent cracking in the insulating material, the reinforced coating did hold the cracked pieces in place.

In another technique, a layer of fibrous insulation is provided next to a pipe and a layer of cellular insulating material, such as cellular glass, surrounds the fibrous layer.

What is needed, therefore, is a relatively simple cellular ceramic insulating body having good insulating efficiency and being operable to substantially prevent thermally induced cracking therein and maintain physical integrity at temperatures up to at least 650° F., and desirably to about 800° F.

SUMMARY OF THE INVENTION

The present invention provides a cellular ceramic insulating body that includes a plurality of rigid cellular ceramic segments and a bonding agent. The bonding agent adhesively secures the cellular ceramic segments to one another so that the cellular ceramic segments are arranged to be positioned adjacent the surface of a member to be insulated. The bonding agent forms a flexible bond that substantially prevents thermal stress failure in the cellular ceramic insulating body at temperatures up to at least 650° F. The cellular ceramic insulating body is operable to resist thermally induced cracking in the cellular ceramic segments at temperatures up to at least 650° F.

In a preferred embodiment, an insulating body is provided that includes a plurality of rigid cellular glass segments and an asphalt extended urethane bonding agent. The insulating body is operable to resist thermally induced cracking in the cellular glass segments at temperatures up to at least 650° F.

A method is provided for forming a cellular ceramic insulating body having resistance to thermally induced cracking at temperatures up to at least 650° F. comprising the steps of providing a plurality of cellular ceramic blocks, adhesively securing the cellular ceramic blocks to one another with a bonding agent to form a unitary structure, and cutting the unitary structure to form therefrom a cellular ceramic insulating body of desired configuration. The bonding agent in the method forms a flexible bond that substantially prevents thermal stress failure in the cellular ceramic insulating body at temperatures up to at least 650° F.

An object of the present invention is to provide a reliable cellular ceramic insulating body which maintains its physical integrity by substantially eliminating cracking or fracturing of the insulating material comprising such body.

This object and other objects of the present invention will be more completely disclosed and described in the following specification, the accompanying drawings and the appended claims.

DESCRIPTION OF THE PREFERRED EMBODIMENTS

Figure 1:
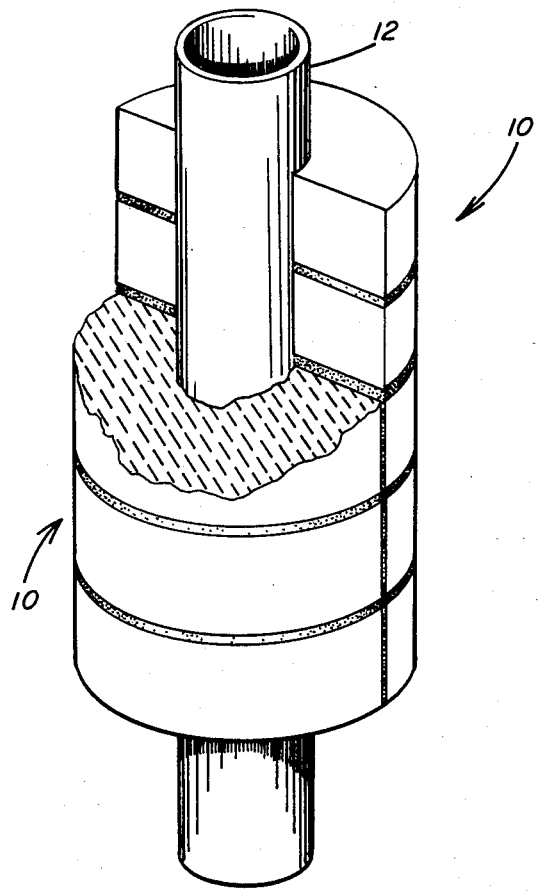
FIG. 1 is a perspective view in of a cylindrical pipe insulated by cellular ceramic insulating bodies according to the invention with a portion of an insulating body broken away to illustrate placement of the insulating bodies in surrounding relation to the pipe.

FIG. 1 illustrates cellular ceramic insulating bodies 10 used for insulating a pipe 12. Such bodies 10 enclose pipe 12 as shown in FIG. 1. The insulating bodies 10 of FIG. 1 are maintained in surrounding relation to pipe 12 by appropriate fastening means (not shown) such as metal bands, wires, tapes, overlapping sealed jacketing, adhesive, etc.

Figure 2:
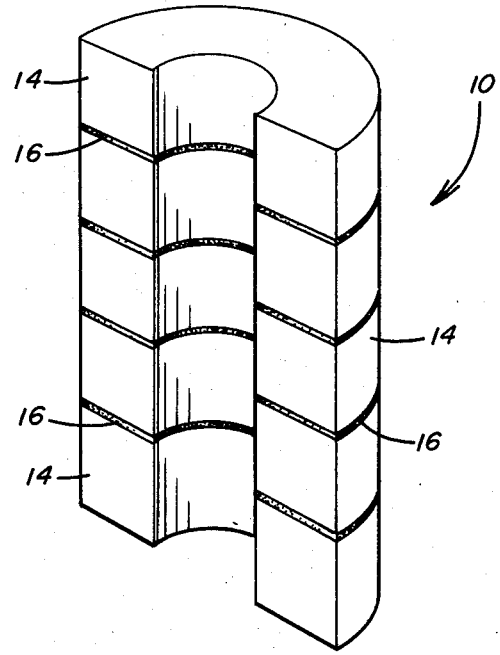
FIG. 2 is a perspective view in of an insulating body of FIG. 1.

FIG. 2 illustrates, in elevation, an insulating body 10 of FIG. 1 for use in insulating pipe 12. The outer surface of insulating body 10 in FIG. 2 has a semi-cylindrical configuration. Insulating body 10 comprises a plurality of rigid cellular ceramic segments 14 adhesively secured to one another by a bonding agent 16, described later herein, and arranged to be positioned adjacent the surface of a member to be insulated, such as pipe 12 of FIG. 1. Such composite insulating body is operable to resist thermally induced cracking at temperatures up to at least 650° F.

It is desirable that the cellular ceramic segments comprise a cellular glass composition. Use of cellular glass segments can provide an insulating body according to the invention that is generally suitable of resist thermally induced cracking over a temperature range from about −100° F. to at least 650° F. Such temperature range should, however, not be construed to limit the scope or application of the invention. Operability to resist cracking over a broader temperature range is possible depending, for example, upon the particular use and the cellular glass composition.

One example of a suitable cellular ceramic material for the cellular ceramic segments is cellular glass formed by mixing pulverulent glass particles with a cellulating agent and forming a cellulatable glass batch as described in U.S. Pat. No. 3,354,024. The formulated glass may comprise, for example, conventional borosilicate or soda lime glass in crushed cullet form and the cellulating agent may comprise a carbonaceous material such as carbon black and the like. Other suitable cellular ceramic materials formed of a cellulatable siliceous compositions are disclosed in U.S. Pat. No. 3,441,396.

Figure 4:
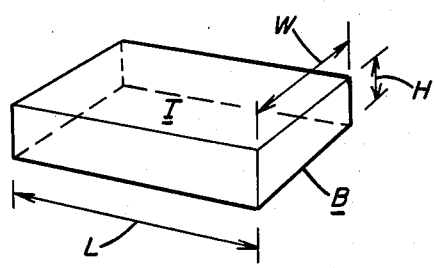
FIG. 4 is a view in perspective of a rigid cellular ceramic block illustrating the principle dimensions and surfaces.

The cellulatable glass batch is placed in a mold as, for example, a substantially rectangular mold. The cellulatable glass batch is then heated to cellulating temperature. At such temperature, the formulated glass particles soften and coalesce and the cellulating agent reacts to generate a gas and form individual closed cells within the block of cellular glass. The blocks of cellular glass are removed from the molds and annealed. Thereafter, these blocks are trimmed and the cellular ceramic segments comprising the insulating body are formed therefrom, as discussed later herein trimmed block 18 of cellular glass is illustrated in FIG. 4 and its principle dimensions are designated by the letters L for length, W for width and H for height. The top, or upper surface, of the trimmed block 18 is designated by the letter T and the bottom, or undersurface, of the trimmed block is designated by the letter B.

Insulating bodies of the invention may be formed in configurations useful for insulating members of different shapes. The dimensions and configuration of an insulating body of the invention and of the cellular ceramic segments comprising such body are dependent upon the use and application of such body. For example, in insulating a substantially straight pipe, such as pipe 12 of FIG. 1, it is customary that the length of an insulating body be approximately 18 inches to about 36 inches. However, the insulating body may be any convenient length, limited only by handling conditions. It is further desirable that the length of each segment comprising the insulating body be about 4–5 inches. Under certain conditions, segment length could be larger or smaller.

In choosing a bonding agent for adhesively securing the segments, it is preferred that the bonding agent will not melt or flow at the intended operating temperature or temperatures to which the insulating body will be subjected. Flowable adhesives such as hot asphalt may be used in cases where the entire adhesive bulk will not reach melt or flow temperatures, leaving sufficient unmelted adhesive to maintain physical integrity. The bonding agent chosen should retain sufficient strength yet remain flexible at operating conditions. It is desirable that the hardness of the bonding agent on the Shore A scale should be below 60 at 75° F. and preferably below 45. The bonding agent should be compatible with the cellular ceramic material. The bonding agent should be high in solid content, such content desirably being about 90% by weight with 95% by weight or higher preferred. It is preferred that the bonding agent be chemically setting, that is the bonding agent be internally curing by reaction of two or more components. It is further desirable that the bonding agent be able to set rapidly to facilitate handling of the insulating body of the invention. A catalyst may be used to accelerate the setting time of certain bonding agents, as is known to those in the art.

Examples of suitable bonding agents are urethanes, silicones, or various epoxy adhesives. These bonding agents may be disadvantageous in some applications due to their high cost. Certain silicone adhesives may be used where combustibility of the adhesive is objectionable or where stress corrosion of stainless steel could be a problem. Hot melt adhesives may also be used as a bonding agent up to temperatures where they will not flow or lose their strength. If hot melt adhesives are employed, such as asphalt, coal tar or other bitumens, application should be limited to temperatures that are at least about 50° F. below the respective softening point of the hot melt adhesive within the majority of the adhesive bulk.

It is desirable for most applications that the bonding agent used in the invention be an asphalt extended, oil extended, or coal-tar extended urethane. An asphalt extended urethane commonly referred to as a urethane modified asphalt is generally most desirable.

Adhesives which have a substantial degree of rigidity after curing are generally considered not suitable for use as a bonding agent in the present invention. Examples of such adhesives are the gypsum adhesives. The rigidity of gypsum adhesives, for example, may promote thermal stress failure in cellular glass segments at elevated temperatures up to at least 650° F.

Figure 3:
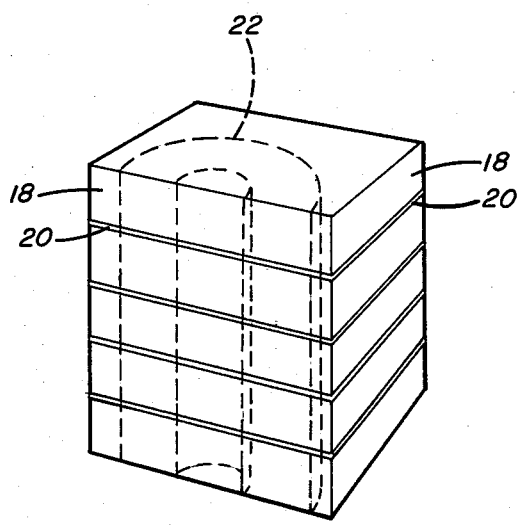
FIG. 3 is a perspective view in of a plurality of rigid cellular ceramic blocks for illustrating a method of forming an insulating body of the invention.

FIG. 3 is illustrative of a method of preparing a composite insulating body of the present invention. Blocks 18 of cellular ceramic material, such as cellular glass, for example, are aligned and placed one on top of each other with the top surface T of one block positioned adjacent the bottom surface B of the block above. A layer of a bonding agent 20, such as a urethane modified asphalt, placed between adjacent blocks 18 as shown in FIG. 3. Bonding agent 20 adhesively joins blocks 18 into a unitary structure. After bonding agent 20 has cured, the insulating body may be cut from such unitary structure by suitable means such as with a core saw. The outline of an insulating body 22 to be cut from such unitary structure is shown in FIG. 3.

The dimensions of each block 18 and the total number of blocks 18 required for the formation of an insulating body of the present invention can vary depending upon the particular design requirements for an insulating body and available thicknesses of the blocks.

Another method for forming an insulating body of the invention includes cutting the cellular ceramic segments from a block or blocks of cellular ceramic material. Then, the cut cellular ceramic segments are joined to each other with an appropriate bonding agent according to the invention.

The following examples 1 and 2 are illustrative of cellular ceramic insulating bodies that do not include the present invention.

EXAMPLE 1

Two half sections of pipe covering were each fabricated as a single, semi-cylindrical shaped segment. These segments were shaped so as to be able to matingly engage a metallic pipe of 6 inch nominal diameter to provide a 4 inch insulation thickness. The segments were shaped or grooved along the longitudinal dimension so that when assembled the top surface of the blocks were in abutting relation. The two shaped segments were banded onto the pipe, heated to 600° F., cooled, and removed from the pipe. Each segment was cracked axially and radially into 5 or 6 pieces and was not reusable.

EXAMPLE 2

Two half sections of pipe covering were each fabricated as a single, semi-cylindrical shaped segment. These segments were shaped so as to be able to matingly engage a metallic pipe of 6 inch nominal diameter to provide a 4 inch insulation thickness. The blocks were shaped in the same manner as Example 1. The two shaped segments were banded onto the pipe, heated to 500° F., cooled, and removed from the pipe. Each segment was cracked axially and radially into 5 or 6 pieces and was not reusable.

The following examples are illustrative of the improved properties and construction of cellular ceramic insulating bodies of the present invention.

EXAMPLE 3

Six blocks of a foamed cellular glass material each being 18 inches in width, 24 inches in length and 4 inches in height, commercially available from Pittsburgh Corning Corporation under the tradename FOAMGLAS were used in the formation of each insulating body. The cellular glass used had a density of approximately 8.5 pounds per cubic foot and a thermal conductivity of about 0.35 B.t.u./hr./sq.ft./°F./in. at a temperature of 75° F.

Six rectangularly shaped blocks were adhesively joined together by a urethane modified asphalt adhesive commercially available from Pittsburgh Corning Corporation, designated as PC 88 adhesive. After mixing the components of the adhesive, the adhesive was appropriately applied to the adjoining surfaces of the cellular glass blocks by conventional means such as with a notched trowel or screed. A conventional catalyst such as dibutyl tin dilaurate was sprayed on the applied adhesive to facilitate setting of the adhesive.

The bottom surfaces B of the blocks were adhesively joined to the top surface T of the adjacent block to form a rectangular block with a length of 24 inches, a width of 18 inches and a height of 24 inches plus the thickness of the adhesive.

After the adhesive had sufficiently cured, an insulating body having an outer surface of semi-cylindrical configuration and having a length of approximately 24 inches was cut from the resulting unitary block structure. Such insulating body was cut so as to be able to matingly engage a metallic pipe of 6 inch nominal diameter and provide a 4 inch insulation thickness. A corresponding insulating body of similar configuration was likewise prepared. The two insulating bodies were placed in facing engagement with each other, thereby surrounding a substantially cylindrical pipe. The two insulating bodies were appropriately secured to each other by conventional means.

The cylindrical pipe was then heated to a temperature from 620° F. to 660° F. and allowed to remain in contact with the composite insulating bodies of the present invention for 168 hours.

At the close of the heating period, it was surprisingly and unexpectedly noted that no cracks or fractures were present in the insulating bodies. The insulating bodies were cooled to 75° F. and again heated to 620° F. for 48 hours with no failure.

EXAMPLE 4

Six blocks of a foamed cellular glass material, each being 18 inches in width, 24 inches in length and 4 inches in depth, commercially available from Pittsburgh Corning Corporation under the tradename FOAM-GLAS were used in the formation of each insulating body. The cellular glass used had a density of approximately 8.5 pounds per cubic foot and a thermal conductivity of about 0.35 B.t.u./hr./sq.ft./°F./in. at a temperature of 75° F.

Six rectangularly shaped blocks were adhesively joined together by a hot asphalt adhesive in a manner similar to Example 3. After the adhesive had sufficiently curved, an insulating body having an outer surface of semi-cylindrical configuration and having a length of approximately 24 inches was cut from the resulting unitary block structure. Such insulating body was cut so as to be able to matingly engage a metallic pipe of six inch nominal diameter and provide a 4 inch insulation thickness. A corresponding insulating body of similar configuration was likewise prepared. The two insulating bodies were placed in facing engagement with each other, thereby surrounding a substantially cylindrical pipe. The two insulating bodies were appropriately secured to each other by conventional means.

The cylindrical pipe was then heated to a temperature from 600° F. to 650° F. Some smoke and fumes were present from the hot asphalt adhesive melting and running onto the hot pipe. After cooling, the insulating bodies adhered to the pipe as a result of the hot asphalt adhesive melting and running onto the pipe and then solidifying upon cooling.

The pipe was then warmed to 300° F. to remove the insulating bodies from the pipe. After the insulating bodies has cooled, the insulating bodies were examined and it was surprisingly and unexpectedly found that no cracks or fractures were present in the insulating bodies.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A cellular ceramic insulating body for insulating a member comprising,
   a plurality of rigid cellular ceramic segments bonded to each other, each of said segments having a preselected height,
   each of said rigid cellular ceramic segments formed from a cellular ceramic block having a length, a width, a height, a top surface and a bottom surface, said preselected height of each of said rigid cellular ceramic segments being substantially equal to the height of the cellular ceramic block from which it is formed,
   a bonding agent adhesively securing top surfaces of said rigid cellular ceramic segments to said bottom surfaces of adjacent cellular ceramic segments,
   said bonding agent providing a flexible bond between said rigid cellular segments and extending substantially perpendicular to the surface of said member being insulated, and
   said cellular ceramic insulating body formed of said bonded rigid cellular ceramic segments being operable to resist thermally induced cracking in the cellular ceramic segments at temperatures up to at least 650° F.

2. The cellular ceramic insulating body as set forth in claim 1 wherein,
   the rigid cellular ceramic segments comprise a cellular glass composition.

3. The cellular ceramic insulating body as set forth in claim 1 wherein,
   said bonding agent has a hardness on the Shore A scale of about 60 or lower at 75° F.

4. The cellular ceramic insulating body as set forth in claim 1 wherein,
   said bonding agent comprises an extended urethane.

5. The cellular ceramic insulating body as set forth in claim 1 wherein,
   said extended urethane is an asphalt extended urethane.

6. The cellular ceramic insulating body as set forth in claim 1 wherein,
   said bonding agent comprises hot asphalt.

7. An insulating body for insulating a pipe comprising,
   a plurality of rigid cellular glass segments bonded to each other, each of said segments having a preselected height,
   each of said rigid cellular glass segments formed from a cellular glass block having a length, a width, a height, a top surface and a bottom surface, said preselected height of each of said rigid cellular glass segments being substantially equal to said height of said cellular glass block from which it is formed,
   a layer of asphalt extended urethane bonding agent adhesively securing the top surfaces of said rigid cellular glass segments to said adjacent bottom surfaces of said cellular glass segments,
   said insulating body formed from said bonded rigid cellular glass segments resisting thermally induced cracking in the cellular glass segments at temperatures up to at least 650° F., and
   said asphalt extended urethane bonding agent forming a flexible bond substantially perpendicular to the outer surface of said pipe being insulated.

8. A method of forming a cellular ceramic insulating body for use in insulating a pipe, said cellular ceramic insulating body having a plurality of cellular ceramic segments bonded to each other, each of said cellular ceramic segments having a preselected height, and said cellular ceramic insulating body having resistance to thermally induced cracking at temperatures up to at least 650° F., comprising the steps of,
   providing a plurality of cellular ceramic blocks having a length, a width, a height, a top surface and a bottom surface,
   adhesively securing the top surfaces of said cellular ceramic blocks to the bottom surfaces of adjacent cellular ceramic blocks with a bonding agent to form a unitary structure,
   said bonding agent forming a flexible bond extending substantially perpendicular to the surface of said pipe being insulated, and
   cutting the unitary structure to form a portion of said cellular ceramic insulating body of desired configuration, each of said cellular ceramic segments in said cellular ceramic insulating body being formed from said cellular ceramic blocks and said preselected height of each cellular ceramic segment being substantially equal to said height of the cellular ceramic block from which it is formed.

9. A method of forming an insulating body for use in insulating a member having an external surface, said insulating body having a plurality of cellular glass segments, each of said cellular glass segments having a preselected height, and said insulating body having resistance to thermally induced cracking at temperatures up to at least 650° F., comprising the steps of,
   providing a plurality of cellular glass blocks having a length, a width, and a height, a top surface and a bottom surface,
   adhesively securing the top surface of said cellular glass blocks to the bottom surface of adjacent cellular glass blocks with an asphalt extended urethane bonding agent to form a unitary structure,
   said asphalt extended urethane bonding agent forming a flexible bond substantially perpendicular to the surface of said member being insulated, and
   cutting the unitary structure to form therefrom the insulating body of desired configuration, each of said cellular glass segments in said insulating body being formed from said cellular ceramic blocks and said preselected height of each cellular glass segment being substantially equal to said height of the cellular glass block from which it is formed.

10. A method of forming a cellular ceramic insulating body for use in insulating a member having a surface, said cellular ceramic insulating body having a plurality of cellular ceramic segments, each of said cellular ceramic segments having a preselected height, and said cellular ceramic insulating body having resistance to thermally induced cracking at temperatures up to at least 650° F., comprising the steps of,
    providing a plurality of cellular ceramic blocks having a length, a width, a height, a top surface and a bottom surface,
    cutting each cellular ceramic block to form therefrom at least one cellular ceramic segment of desired shape, each said cellular ceramic segments having said preselected height substantially equal to said height of the cellular ceramic block from which it is formed and a top surface formed from said block top surface and a bottom surface formed from said block bottom surface,
    adhesively securing the top surface of said cellular ceramic segments to the bottom surface of adjacent cellular ceramic segments with a bonding agent to form said cellular ceramic insulating body of desired configuration, and
    said bonding agent forming a flexible bond substantially perpendicular to the surface of said member to be insulated thereby preventing thermal stress failure in said cellular ceramic insulating body at temperatures up to at least 650° F.

* * * * *